Feb. 9, 1971 G. F. BECKWELL 3,561,122
ANGLE OF BEND READER
Original Filed July 19, 1967 2 Sheets-Sheet 1
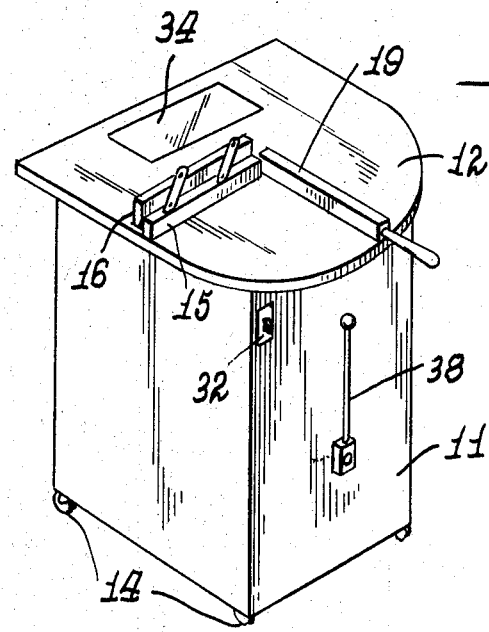
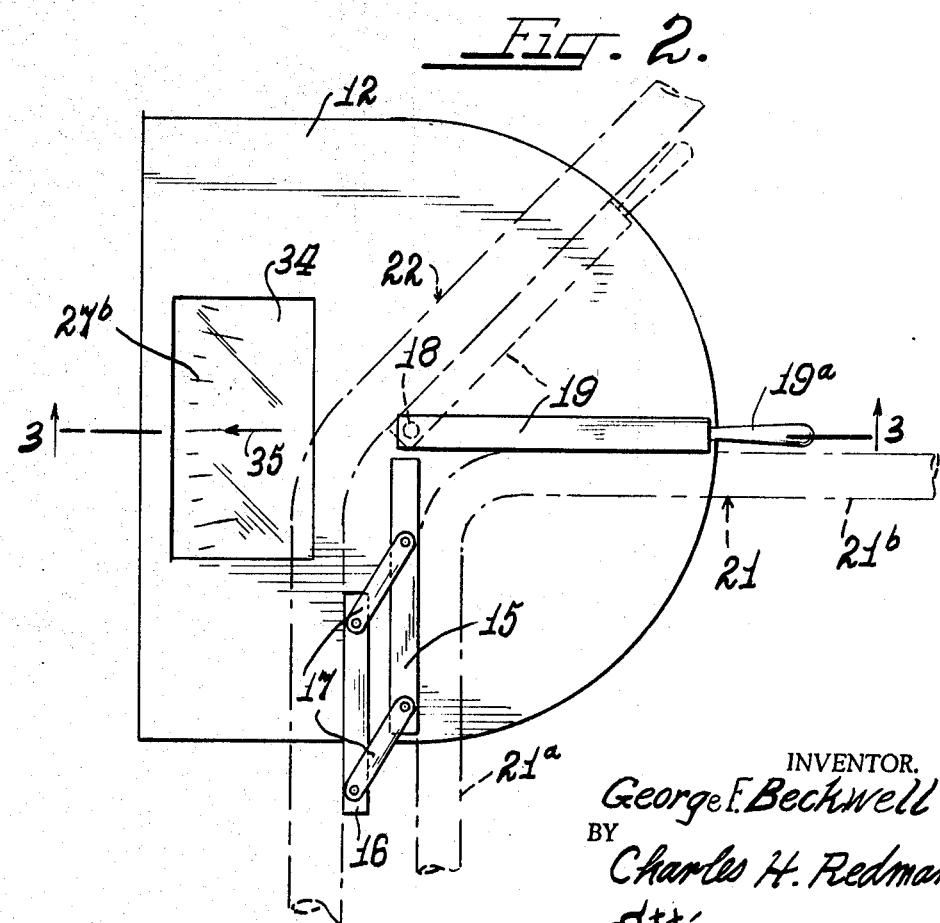
INVENTOR.
George F. Beckwell
BY Charles H. Redman
Atty.

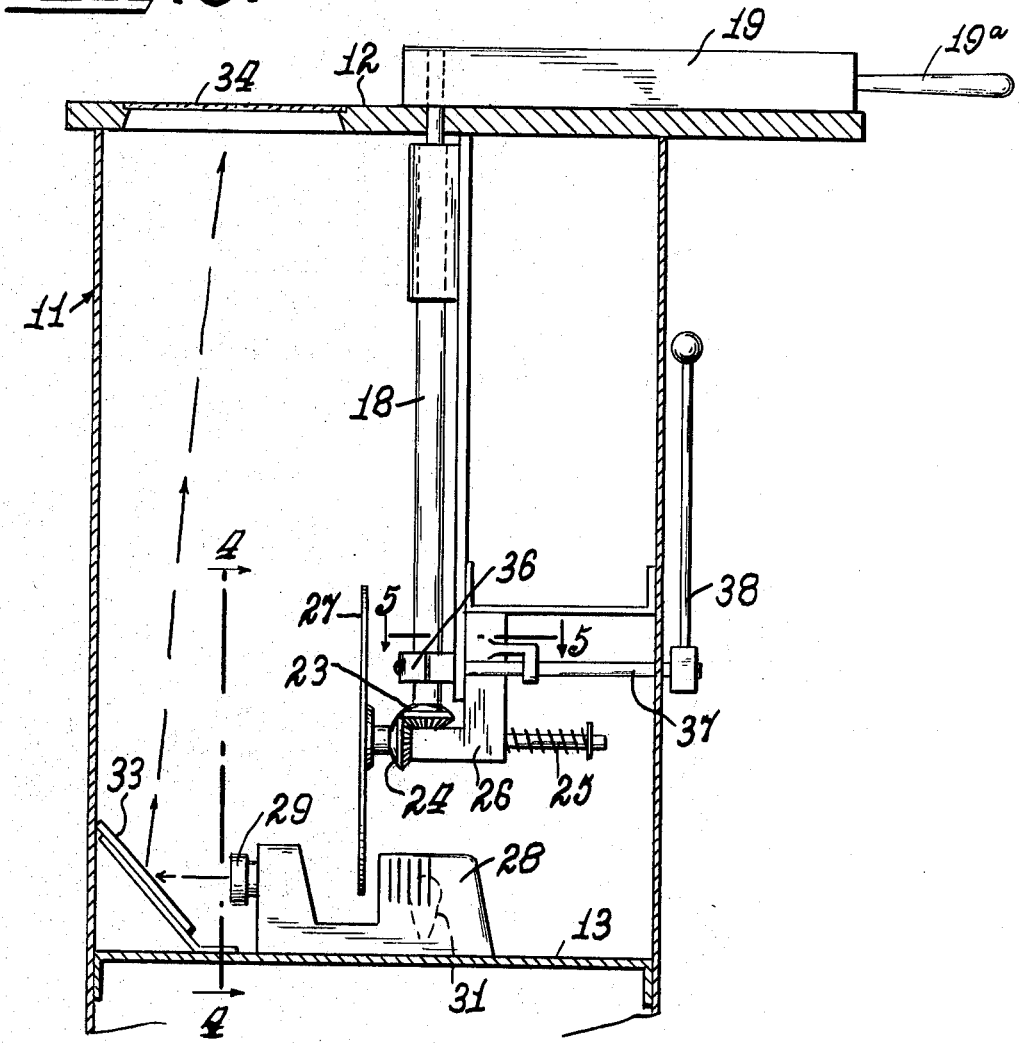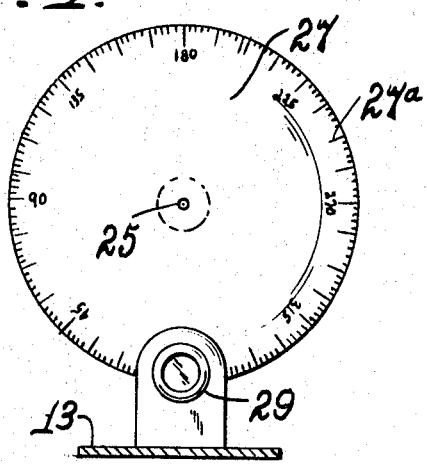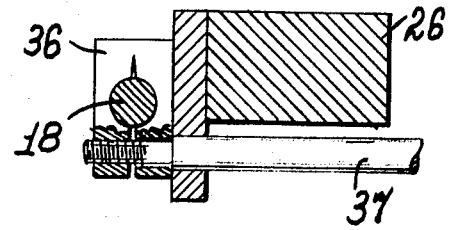

United States Patent Office 3,561,122
Patented Feb. 9, 1971

3,561,122
ANGLE OF BEND READER
George F. Beckwell, Aurora, Ill., assignor to Pines Engineering Co., Inc., Aurora, Ill., a corporation of Illinois
Continuation of application Ser. No. 654,541, July 19, 1967. This application Sept. 2, 1969, Ser. No. 854,803
Int. Cl. G01p 9/10
U.S. Cl. 33—75    2 Claims

ABSTRACT OF THE DISCLOSURE

Apparatus including a protractor disc and a lens system for visually recording on a screen the angle of bend present in a piece of tubular, rod or like stock.

---

This is a continuation of Ser. No. 654,541 filed July 19, 1967 and now abandoned.

This invention relates to improvements in visual readers for determining the angle of bend in tubular or rod stock.

In the art of tube bending it frequently occurs that one must ascertain the angle of bend performed in a length of tubular or rod stock for checking accuracy of the bend, or for determining the angle of an existing bend for purposes of duplication. The apparatus of the present invention includes novel means adjustable to the bend for actuating a calibrated reader, the reading of which is projected on an enlarged scale onto a viewing screen. It is comprised generally of a horizontal work surface having relatively adjustable gauge members thereon, the adjustable member being mechanically connected with a protractor calibrated disc which is so associated with light projection means as to have its readings enlarged and projected onto a viewing screen. The apparatus also includes means to lock the mechanism in any position of adjustment.

It is, therefore, an object of the invention to provide apparatus of the character referred to.

Another object is to provide apparatus of the character referred to with relatively movable bend gauge elements.

Another object is to provide a novel reader for a bend gauging apparatus.

Another object of the invention is to provide readily operable manual means for adjusting the apparatus to measure a given bend.

Another object is to provide novel means for locking the reader at any selected angle reading.

Another object is to provide novel means to adjust the apparatus to accommodate bends of different radii.

Another object is to provide apparatus of the character referred to which is not expensive or difficult to manufacture, is extremely simple in use and very accurate in use.

The structure by means of which the above noted and other advantages of the invention are attained will be described in the following specification, taken in conjunction with the accompanying drawings, showing a preferred illustrative embodiment of the invention, in which:

FIG. 1 is a perspective view of the apparatus;
FIG. 2 is an enlarged plan view of the apparatus;
FIG. 3 is an enlarged vertical sectional view taken substantially on line 3—3 of FIG. 2;
FIG. 4 is a sectional view in detail taken along line 4—4 of FIG. 3; and,
FIG. 5 is a sectional view in detail taken on line 5—5 of FIG. 3.

Referring now to the exemplary disclosure of the apparatus as shown in the accompanying drawings, the apparatus is mounted on and contained in a sheet metal housing 11 including a top wall 12 and a bottom 13. The housing preferably is mounted on castors 14 so as to be extremely portable.

Fixedly mounted on the upper surface of the top wall 12 is a bar 15 having a second bar 16 loosely connected thereto by parallelogram links 17. A rotatable shaft 18 extends from within the housing through the top wall at one end of the fixed bar 15 and mounted firmly on said shaft on the upper surface of said top wall is a bar 19 that is rotatable about the shaft axis upon manual manipulation thereof. A handle 19a is provided on the free end of the bar 19 for rotating the same.

As best shown in FIG. 2, a piece of bent stock 21 may be laid on the top wall 12 with one leg 21a bearing against the fixed bar 15. The pivotally movable bar 19 is then rotated about its mounting axis so as to bring it into abutment with the other leg 21b of said bent stock. In the alternative, a piece of bent stock 22 may be laid on the top wall with its legs in abutment with the second bar 16 and the bar 19. Thus it will be seen that the apparatus can accommodate stock bent at any obtuse or acute angle, for measuring the inside or outside bend.

The vertical rotatable shaft 18 carries on its lower end, within housing 11, a bevel gear 23 that is meshed at all times with a companion gear 24 carried on a horizontal shaft 25 journalled for free rotation in a rigid bracket 26. The shaft 25 carries on one end a transparent, calibrated protractor disc 27. The lower peripheral margin of said disc is located at all times in front of a lamp housing 28 having associated with it a lens assembly 29 disposed in front of said disc. The lamp housing contains a lamp 31 which receives current through lines having a switch 32 connected therein. It should be apparent at this time that when the disc 27 is rotated in response to rotation of the vertical shaft 18, successive indicia 27a on the disc is carried into the path of light emitted from the lamp casing and its image is projected through the lens assembly 29.

Mounted in advance of the lens assembly 29 and in position to receive the projected image is a reflector plate 33, such as a mirror, angled so as to project the beam upwardly onto a translucent screen 34 laid in and forming a part of the housing top wall 12.

The image 27b projected on the screen 34 is enlarged by the lens assembly 29. Thus, a very readily readable image is projected onto the screen. A zero indicia 35 is provided on the screen so that when the bend in the piece of stock 21 is being measured, an image of the 90° marking on the disc 27 will be projected and it will register with the zero indicia on the screen. When a piece of stock, such as the piece 22 illustrated, is being measured, the projected reading will be 45°. Thus, any angle of bend may be measured and its measure registered on screen 34.

In some instances it may be required or desired to lock the bar 19 in a given position for subsequent reference. To this end, a split clamp 36 is arranged around the base end of vertical shaft 18, having a rotatable control rod 37 extending therefrom and projecting out of one side wall of the housing. The projected end carries a hand lever 38. Upon rotation of said lever in either direction the tension of the split clamp can be adjusted from full release to lock.

Although I have described a preferred embodiment of my invention, in considerable detail, it will be understood that the description thereof is intended to be illustrative, rather than restrictive, as details of the structure may be modified or changed without departing from the spirit or scope of the invention. Accordingly, I do not desire to be restricted to the exact construction described.

I claim:
1. An apparatus for measuring the angle of a planar bend defined by two legs of a length of bent stock, comprising:
  a generally horizontal planar surface on the housing, providing a support for the two legs of said length of stock which define the bend, said surface being free of projections, to accommodate the stock regardless of the angle of bend;

an elongated planar reference element mounted on and extending upwardly from said supporting surface providing a stop against which one leg of a bend in said piece of stock is abutted, said reference element extending from a central point of said supporting surface outwardly toward the periphery thereof and having a pair of parallel reference surfaces;

an elongated planar angle measuring element extending upwardly from and pivoted at one end to said supporting surface, at a central point thereof, adjacent one end of said reference element and extending outwardly toward the periphery of the supporting surface, said measuring element being movable about said pivot through a range of substantially 360° to engage the other leg of the bend in said piece of stock and having a pair of parallel measuring surfaces;

one of said reference surfaces and one of said measuring surfaces being adapted to cooperate with each other to facilitate the measuring of the inside bend of a piece of stock and the other of said reference surfaces and the other of said measuring surfaces being adapted to cooperate with each other for facilitating the measurement of an outside bend of a piece of stock; and means connected with said measuring element for indicating to an operator the angle between said reference and measuring elements and including a translucent screen on said horizontal supporting surface, a protractor connected with said measuring element and having indicia thereon, and means for projecting said protractor indicia onto said screeen.

2. The apparatus of claim 1 in which said screen is flush with said horizontal supporting surface.

References Cited

UNITED STATES PATENTS

| 2,380,792 | 7/1945 | Rueb | 33—174(E) |
| 3,060,587 | 10/1962 | Dicken | 33—174(N) |
| 3,102,413 | 9/1963 | Serdahely. | |

FOREIGN PATENTS

| 989,496 | 5/1951 | France | 33—75 |
| 1,326,982 | 2/1956 | Germany | 33—174(E) |
| 227,622 | 1/1925 | Great Britain. | |

HARRY N. HAROIAN, Primary Examiner

U.S. Cl. X.R.

33—174